United States Patent Office 3,637,847
Patented Jan. 25, 1972

3,637,847
N-HALOALKYL-ANILIDES
John F. Olin, Ballwin, Mo., assignor to Monsanto
Company, St. Louis, Mo.
No Drawing. Continuation-in-part of application Ser. No.
705,031, Feb. 13, 1968, which is a continuation-in-part
of application Ser. No. 535,664, Mar. 21, 1966, which
in turn is a continuation-in-part of application Ser. No.
329,279, Dec. 9, 1963. This application Sept. 3, 1969,
Ser. No. 855,030
The portion of the term of the patent subsequent to
May 6, 1986, has been disclaimed
Int. Cl. C07c *103/33*
U.S. Cl. 260—562 B                                    18 Claims

ABSTRACT OF THE DISCLOSURE

N-haloalkylanilides and their preparation by the reaction of acyl halides with aromatic azoalkine.

These compounds possess herbicidal activity and are valuable intermediates for the preparation of compounds having herbicidal activity.

---

This application is a continuation-in-part of application Ser. No. 705,031 filed Feb. 13, 1968, now abandoned which in turn is a continuation-in-part of application Ser. No. 535,664, filed Mar. 21, 1966, now abandoned, which in turn is a continuation-in-part of application Ser. No. 329,279, filed Dec. 9, 1963, now abandoned.

This invention relates to N - alphahaloalkyl - anilide which possess herbicidal properties and their preparation. This invention further relates to specific N-alphahaloalkyl-anilides.

The term "plant system" as used herein and in the appended claims means germinant seeds, emerging seedlings and established vegetation including the roots and aboveground portions.

The N-alphahaloalkylanilide of this invention are of the formula

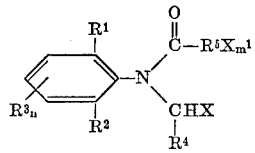

wherein $R^1$ is alkyl having a maximum of ten carbon atoms; $R^2$ is selected from the group consisting of hydrogen, alkyl having a maximum of eight carbon atoms and alkoxy having a maximum of four carbon atoms; $R^3$ is selected from the group consisting of halogen, alkyl having a maximum of eight carbon atoms and alkoxy having a maximum of four carbon atoms; $R^4$ is selected from the group consisting of hydrogen, alkyl, alkenyl, alkynyl each having a maximum of eighteen carbon atoms and the group

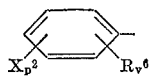

wherein $X^2$ is halogen; $R^6$ is selected from the group consisting of hydroxy and alkyl having a maximum of four carbon atoms; $p$ is one of the integers 0 to 5; $v$ is one of the integers 0 to 2; $R^5$ is selected from the group consisting of alkyl, alkenyl, alkynyl and aryl each having a maximum of 18 carbon atoms; $X$ and $X^1$ are each independently halogen; $m$ is one of the integers 0 to 5; and $n$ is one of the integers 0 to 3.

A preferred embodiment of this invention are those N-alphahaloalkylanilide of the formula

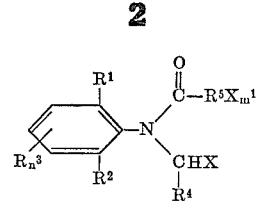

wherein $R^1$ and $R^2$ are each independently alkyl having a maximum of ten carbon atoms; $R^3$ is selected from the group consisting of halogen and alkyl having a maximum of eight carbon atoms; $R^4$ is selected from the group consisting of hydrogen, alkyl, alkenyl each having a maximum of eighteen carbon atoms and the group

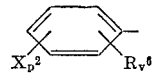

wherein $X^2$ is halogen; $R^6$ is selected from the group consisting of hydroxy and alkyl having a maximum of four carbon atoms; $p$ is one of the integers 0 to 5; $v$ is one of the integers 0 to 2; $R^5$ is selected from the group consisting of alkyl, alkenyl and aryl each having a maximum of eighteen carbon atoms; $X$ and $X^1$ are each independently selected from the group consisting of chloro, bromo and iodo; $m$ is one of the integers 0 to 5; and $n$ is one of the integers 0 to 3.

A more preferred embodiment of this invention are those N-alphahaloalkyl-anilide of the formula

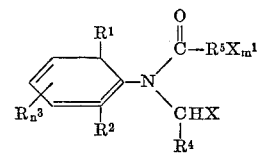

wherein $R^1$ and $R^2$ are each independently alkyl having a maximum of four carbon atoms; $R^3$ is selected from the group consisting of halogen and alkyl having a maximum of four carbon atoms; $R^4$ is selected from the group consisting of hydrogen, alkyl, alkenyl each having a maximum of six carbon atoms and the group

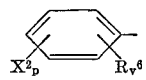

wherein $X^2$ is halogen; $R^6$ is selected from the group consisting of hydroxy and alkyl having a maximum of four carbon atoms; $p$ is one of the integers 0 to 3; $v$ is one of the integers 0 to 2; $R^5$ is selected from the group consisting of alkyl having a maximum of four carbon atoms; $X$ and $X^1$ are each independently selected from the group consisting of chloro, bromo and iodo; $m$ is one of integers 0 to 2; and $n$ is one of the integers 0 to 2.

Representative $R^1$ in the formula include but is not limited to methyl, ethyl, n-propyl, isopropyl, n-butyl, isobutyl, sec butyl, tert-butyl, n-amyl, tert-amyl, 1,1,2-trimethylpropyl, 1,1 - dimethylbutyl, 1,1 - dimethylamyl, 1,1,2-trimethylbutyl, 1,1,3,3 - tetramethylbutyl, 1,1,2,3-tetramethylbutyl, 1,1,2,2-tetramethylbutyl and 1,1-dimethyloctyl. In the formula $R^2$ as an alkyl can be for example, methyl, ethyl, n-propyl, isopropyl, n-butyl, isobutyl, sec-butyl, tert-butyl, n-amyl, n-hexyl, n-heptyl, n-octyl and the various homologues and isomeric forms of alkyl having not more than 8 carbon atoms. As alkoxy, $R^2$ can be for example, methoxy, ethoxy, n-propoxy, isopropoxy, n-butoxy, sec-butoxy and tert-butoxy. In the formula $R^3$ can be the alkyl or alkoxy listed above for $R^2$ and also halogen (Cl, Br, F and I).

Representative aliphatic $R^4$ hydrocarbyl for the compounds of the formula include by way of example alkyl such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl having from 1 to 18 carbon atoms, alkenyl such as vinyl, allyl, n-butenyl-1, n-butenyl-2, n-pentenyl-2, n-hexenyl-2,2,3-dimethylbutenyl-2, n-heptenyl, n-decenyl, n-dodecenyl and the various homologues and isomers of alkenyl having 2 to 18 carbon atoms and alkenyl such as propargyl and the various homologues and isomers of alkynyl having from 3 to 18 carbon atoms.

Representative aryl and substituted aryl $R_4$ for the formula which are represented by the structure

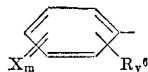

include by way of example phenyl, o-chlorophenyl, m-chlorophenyl, m-bromophenyl, p-chlorophenyl, 2,4-dibromophenyl, 2,4-dichlorophenyl, 2,5-difluorophenyl, 3,5-dichlorophenyl, 2,4,6-tribromophenyl, 2-chloro-4-hydroxyphenyl, 2-bromo - 5 - hydroxyphenyl, 2,5-diiodophenyl, 2,4,5-trichlorophenyl, 2,4,6-trifluorophenyl, 2,3-dichloro-5-hydroxyphenyl, 2,3,4,6 - tetrachlorophenyl, 2,3,4,5,6-pentachlorophenyl, o-hydroxyphenyl, m-hydroxyphenyl, p-hydroxyphenyl, 2,4-dihydroxyphenyl, 2,4-dihydroxy-6-chlorophenyl, 2,6-dihydroxyphenyl, 2,3-dihydroxyphenyl, methylphenyl, 2 - chloro-4-methylphenyl, 2,4-dichloro-6-methylphenyl, 2,4-dimethylphenyl, ethylphenyl, n-propylphenyl, isopropylphenyl, 2,4 - dimethyl-6-chlorophenyl, tert-butylphenyl, 2,4-di(tert-butyl)-phenyl and 2,6-di(tert-butyl)phenyl.

Representative $R^5$—$X^1_m$ for the above formula include by way of example the alkyl, alkenyl and alkynyl listed above for $R^4$; aryl such as phenyl, naphthyl, biphenyl and the like; haloalkyl such as chloromethyl, iodomethyl, bromomethyl, fluoromethyl, chloroethyl, iodoethyl, bromoethyl, fluoroethyl, trichloromethyl, diiodoethyl, dibromoethyl, trifluoromethyl, dichloroethyl, chloro-n-propyl, iodoisopropyl, bromo-n-butyl, bromo-tert-butyl, 1,3,3-trichlorobutyl, 1,3,3 - tribromobutyl, chloropentyl, bromopentyl, 2,3 - dichloropentyl, 3,3 - dibromopentyl, chlorohexyl, bromohexyl, 2,4-dichlorohexyl, 1,3-dibromohexyl, 1,3,4-trichlorohexyl, chloroheptyl, bromoheptyl, fluoroheptyl, 1,3-dichloroheptyl, 1,4,4 - trichloroheptyl, 2,4-dichloromethylheptyl, chlorooctyl, bromooctyl, iodooctyl, 2,4-di(chloromethyl)hexyl, 2,4-dichlorooctyl, 2,4,4-trichloromethylpentyl, 1,3,5-tribromooctyl and the halogenated straight and branched chain nonyl, decyl, undecyl, dodecyl, tridecyl, tetradecyl, pentadecyl, hexadecyl, heptadecyl and octadecyl; haloalkenyl such as chlorovinyl, bromovinyl, chloroallyl, bromoallyl, 3-choro-n-butenyl-1, 3-chloro-n-pentenyl-1, 4-chloro-n-hexenyl-2, 3,4-dichloromethylpentenyl-1, 3-fluoro-n-heptenyl-1, 1,3,3-trichloro-n-heptenyl-5, 1,3,5-trichloro-n-octenyl-6, 2,3,3 - trichloromethylpentenyl-4 and the various homologues and isomers of haloalkenyl having 2 to 18 carbon atoms; haloalkynyl such as chloropropargyl, bromopropargyl, iodopropargyl and the various homologues and isomers of haloalkynyl having 3 to 18 carbon atoms and haloaryl such as o-chlorophenyl, m-chlorophenyl, m-bromophenyl, p-chlorophenyl, 2,4-dichlorophenyl, 3,5-dichlorophenyl, 2,4,6-tribromophenyl, 2,5-diiodophenyl, 2,4,5 - trichlorophenyl, 2,4,6 - trifluorophenyl, 2,3,4,6 - tetrachlorophenyl and 2,3,4,5,6-pentachlorophenyl.

The compounds of this invention are prepared by the process which comprises reacting an acyl halide of the formula $XOCR^5$—$X^1_m$ with an aromatic azoalkine of the formula

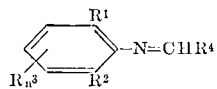

wherein $R^1$, $R^2$, $R^3$, $R^4$, $R^5$, X, $X^1$, $m$ and $n$ are as defined above.

The azoalkine reactants, used for the preparation of the compounds of this invention, are prepared by the reaction of an aniline derivative with the appropriate aldehyde according to the following reaction

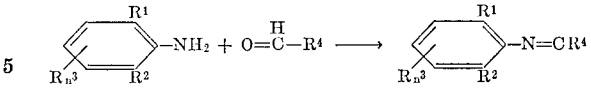

wherein $R^1$, $R^2$, $R^3$, $R^4$ and $n$ are as previously defined.

The process of the present invention can be carried out with substantially equimolar amounts of reactants but an excess of either can be employed. For greater yields the acyl halide is preferably present in excess of equimolar amounts. The reactants are usually admixed at room temperature, i.e., about 25° C. However, higher or lower temperatures can be employed, the temperature not being critical. The reaction is substantially complete when the exothermic reaction which occurs upon admixture of reactants has subsided. A supplemental reaction period at temperatures below the decomposition temperature of the products is usually employed to ensure complete reaction. The supplemental reaction period preferably is carried out below about 100° C. by heating at reflux. The process is preferably carried out in the presence of an inert organic medium. Suitable inert media include, for example, aliphatic and aromatic hydrocarbons such as n-heptane, hexane, benzene, toluene, xylene and the like.

The separation of the resulting reaction product from the reaction mixture is readily accomplished by conventional means. For example, the solvent and unreacted acyl halide or azoalkine can be removed by stripping or distillation, preferably low temperature vacuum distillation. The product can be purified by fractional distillation under reduced pressure, selective extraction, crystallization or any suitable combination of these.

The compounds of this invention have herbicidal activity and this activity is best exhibited by the alpha-haloacetanilide herbicides represented by the formula wherein $R^5$—$X_m^1$ is $CH_2Cl$, $CH_2Br$ or $CH_2I$. In accordance with this invention it has been found that the growth of germinant seeds, emerging seedling and established vegetation can be controlled or modified by exposing the germinant seeds, emerging seedlings or the roots of aboveground portions of established vegetation to the action of an effective amount of one or more of the alpha-haloacetanilides represented by the formula

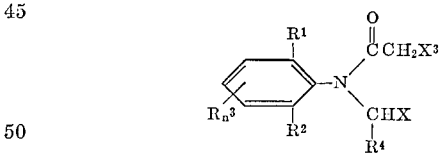

wherein $X^3$ is selected from the group consisting of Cl, Br and I and $R^1$, $R^2$, $R^3$, $R^4$, X and $n$ are as previously defined. The most preferred herbicides are those wherein the alkyl acid and alkenyl of $R^4$ have not more than 5 carbon atoms. These compounds are effective as general herbicides, including post-emergent herbicides and pre-emergent herbicides, but their most outstanding utility is as pre-emergent herbicides. Furthermore, these compounds are characterized by broad spectrum herbicidal activity; i.e., they modify the growth of a wide variety of plant systems including both broadleaf and grass plants. For the sake of brevity and simplicity the term "active ingredient" will be used hereinafter to describe the herbicides of this invention as represented by the formulas above.

The herbicidal compositions of this invention contain at least one active ingredient and a material referred to in the art as a herbicidal adjuvant in liquid or solid form. The herbicidal compositions are prepared by admixing the active ingredient with an adjuvant including diluents, extenders, carriers and conditioning agents to provide compositions in the form of finely-divided particulate solids, granules, pellets, solutions and aqueous dispersions or emulsions. Thus, the active ingredient can be used with an adjuvant such as a finely-divided particulate solid, a solvent liquid of organic origin, water, a wetting agent, dispersing agent, an emulsifying agent or any suitable combination of these.

The term "herbicidal composition" as used herein and in the appended claims is intended to mean not only compositions in a suitable form for application, but also concentrated compositions which require dilution or extension with a suitable quantity of additional liquid or solid adjuvant prior to application.

The compounds of this invention are also useful as intermediates in making other new compounds, particularly herbicides, which are disclosed in U.S. Pat. 3,442,945. In U.S. Pat. 3,442,945 the compounds of this invention are subjected to hydrolysis or reacted with an alcohol, mercaptan, phenol or thiophenol to make new compounds wherein the X of this invention is replaced by OH, OR or SR, the R being the residual organic portion provided by the alcohol, mercaptan, phenol or thiophenol.

The invention will be more clearly understood from the following detailed description of specific examples thereof:

EXAMPLE 1

This example describes the preparation of 2-bromo-N-bromomethyl-2'-tert-butyl-6'-methylacetanilide. To a 500 ml. 4-neck flask were added 99 g. of bromoacetylbromide and 150 g. of n-heptane. With stirring 85 g. of 2-tert-butyl-6-methyl-N-methyleneaniline were added dropwise over a 15-minute period, the temperature rising exothermically from 23° to 75° C. After the addition of the azomethine was complete the reaction mixture was refluxed for 5 minutes. The reaction mixture then was transferred to a beaker and placed in a deep freeze where crystallization took place. The reaction mixture was filtered and the crystallized solid removed by filtration was washed with hexane. This solid was washed with a 50:50 n-heptane/toluene mixture and dried on a funnel overnight under nitrogen. The peach-colored, sandy solid product recovered from the funnel weighed 161 g., M.P. 103–107° C. An elemental analysis of the product yielded the following results:

Calc'd for $C_{14}H_{19}Br_2NO$ (percent): C, 44.6; H, 5.1; Br, 42.3. Found (percent): C, 44.9; H, 5.3; Br, 42.2.

EXAMPLE 2

This example describes the preparation of 2'-tert-butyl-2-chloro-N-chloromethyl-6'-methylacetanilide. A flask was charged with 37.6 g. of chloroacetyl chloride (0.33 mole) and 150 ml. of hexane. With stirring 51 g. of 2-tert-butyl-6-methylphenylazomethine was added over a period of 10 minutes, the temperature rising exothermically from 23° to 70° C. After the addition was complete the reaction mixture was refluxed for 15 minutes, using a Drierite tube on the condenser. The reaction mixture was chilled to −20° C. with stirring until crystallization occurred and then placed in an ice box. The crystals were filtered, washed with three 50 ml. portions of hexane and dried under nitrogen. The product crystals weighed 77.5 g. M.P. 90–91.5° C. A chlorine analysis of the product gave 24.3% chlorine vs. a theoretical chlorine content for the desired product of 24.6%.

EXAMPLE 3

This example describes the preparation of 2'-tert-butyl-2-chloro-N-chloromethyl-6'-ethylacetanilide. A flask was charged with 113 g. of chloroacetyl chloride (1 mole) and 250 g. of n-heptane, and then 189.3 g. of 2-tert-butyl-6-ethyl-N-methyleneaniline (1 mole) were added with stirring over a one-half hour period. The temperature in the flask rose from 20° C. to 75° C. The reaction mixture, after the addition of the reactants was complete, was refluxed briefly and then allowed to cool. A Drierite tube was used on the condenser to exclude water. The cooled reaction mixture was placed in a deep freeze. The next morning it was noted that a heavy oil product had separated from the n-heptane and that a small amount of solid product was also present. To the reaction mixture was added 200 ml. of hexane and 50 ml. of toluene. The reaction mixture was then subjected to rapid swirling and seeded with the solid which had separated. This caused an immediate crystallization from the reaction mixture. The reaction mixture was placed in a deep freeze overnight and then in a refrigerator for 2 hours. The reaction mixture was then filtered and the solid product washed with cold hexane and dried on a Buchner funnel under nitrogen. The product recovered weighed 254 g., M.P. 82–84° C. An elemental analysis of the product crystals yielded the following results:

Calc'd for $C_{15}H_{21}Cl_2NO$ (percent): C, 59.6; H, 7.0; Cl, 23.4. Found (percent): C, 59.7; H, 7.1; Cl, 23.2.

EXAMPLE 4

This example describes the preparation of 2-bromo-N-bromomethyl-2'-tert-butyl-6' - ethylacetanilide. A flask was charged with 121 g. (0.6 mole) of bromoacetyl bromide and 200 g. of n-heptane. The mixture was heated to 95° C. and 113.75 g. (0.6 mole) of 2-tert-butyl-6-ethyl-N-methyleneaniline was added to the flask with stirring over a thirty minute period. An exothermic reaction occurred. The reaction mixture was heated for 5 minutes after the addition of the methyleneaniline had been completed. The reaction mixture was allowed to cool. After cooling, the reaction mixture was filtered and the crystalline product washed with 200 ml. of 3:1 hexane/benzene mixture, and dried under nitrogen. The product was a tan crystalline solid weighing 210 g. M.P. 100–104° C. A bromine analysis of the product yielded 40.8% bromine; calculated for $C_{15}H_{21}Br_2NO$, Br—40.86.

EXAMPLE 5

This example describes the preparation of 2-bromo-2'-tert-butyl-N-chloromethyl-6'-methylacetanilide. A flask was charged with 59 g. (0.5 mole) of bromoacetyl chloride and 225 ml. of toluene. Over a period of one-half hour, 87.5 g. of 2-tert-butyl-6-methyl-N-methyleneaniline was added and the temperature increased with an exothermic reaction from 20° C., to 80° C. The reaction mixture was heated to 85° C., and then refluxed for five minutes at 100° C., pot temperature. The reaction mixture was cooled to about 10° C., filtered, and the solid product washed with 1:3 mixture of hexane/toluene and dried under nitrogen. The product consisted of pale tan crystals weighing 125 g., M.P. 88–90° C. A bromine analysis of the product gave 23.9% bromine and a chlorine analysis 10.4% chlorine. Calculated for $$C_{14}H_{19}BrClNO: Br=24.02, Cl=10.66$$

EXAMPLE 6

This example describes the preparation of 2'-tert-butyl-2 - chloro-N-(1-chloro-2-butenyl)-6'-methylacetanilide. A flask was charged with 56.5 g. (0.5 mole) of chloroacetyl chloride and 200 g. of n-heptane. With stirring the reaction mixture was heated to 50° C. and then 99 g. (0.46 mole) of 2 - tert-butyl-N-crotonylidene-6-methylaniline was added over a one-half hour period. An exothermic reaction raised the temperature to 70° C. At the end of the addition, the reaction mixture was heated to 90° C., at which point it became a clear red-brown mixture and a small amount of HCl was evolved. When the reaction mixture had cooled to about 65° C., the product was transferred to a beaker and placed in deep freeze. The product crystallized overnight in the deep freeze. The reaction mixture was filtered and the product washed with 2:1 hexane/toluene mixture and dried under nitrogen. The product was a tan powder weighing 101 g., M.P. 68–70° C. An elemental analysis of the product yielded the following results:

Calc'd for $C_{17}H_{23}Cl_2NO$ (percent): carbon, 62.2; hydrogen, 7.1; chlorine, 21.6. Found (percent): carbon, 62.4; hydrogen, 7.2; chlorine, 21.3.

EXAMPLE 7

This example describes the preparation of 2-bromo-2'-tert-butyl-N - (alpha-bromo-2-hydroxybenzyl) - 6'-ethylacetanilide. Into a reaction vessel charged with 70.7 g. (0.35 mole) of bromoacetyl bromide in 100 ml. of toluene was added 88 gm. (0.31 mole) of 2-tert-butyl-6-ethyl salicylidene aniline in 250 ml. of toluene with stirring over a five minute period. The temperature in the flask rose exothermically from 23° to 40° C. Heat was then applied bringing the pot temperature to 110° C. for a few minutes. A small amount of HBr evolved and a solid separated. After cooling the sandy, cream-colored solid was removed by filtration, washed with benzene and dried under nitrogen. This solid weighed 145 gm., M.P. 168–169° C. with decomposition. An elemental analysis of the product yielded the following results:

Calc'd for $C_{21}H_{25}Br_2NO_2$ (percent): C, 52.2; H, 5.2; Br, 33.1. Found (percent): C, 52.4; H, 5.5; Br, 32.4.

EXAMPLE 8

This example describes the preparation of 2'-tert-butyl-N-chloromethyl-2,4-dichloro-6'-methylbenzanilide. A reaction mixture comprising 97 g. (0.46 mole) of 2,4-dichloro-benzoyl chloride, 84 g. (0.48 mole) of 2-tert-butyl-6-methyl-N-methyleneaniline and 150 g. of n-heptane was refluxed overnight at about 102° C. Upon cooling, a portion of the reaction mixture solidified, leaving an upper heptane layer, which was decanted. The solid was recrystallized from a 50:50 n-heptane/toluene mixture, washed with 100 ml. of n-heptane and dried under nitrogen. The product was an off-white solid, weighing 142 gm., M.P. 110–120° C. An elemental analysis of this product yielded the following results:

Calc'd for $C_{21}H_{25}Br_2NO_2$ (percent): C, 59.3; H, 5.2; Cl, 27.6. Found (percent): C, 59.3; H, 5.3; Cl, 26.2.

Following substantially the same procedure as in the foregoing examples, the following compounds are prepared:

| Example | Compound |
| --- | --- |
| 9 | 2'-tert-butyl-N-chloromethyl-2-iodo-6'-methylacetanilide. |
| 10 | 2-bromo-2'-tert-butyl-N-(alpha-bromo-2,4-dichlorobenzyl)-6'-methylacetanilide. |
| 11 | 2'-tert-butyl-2-chloro-N-chloromethyl-4',6'-dimethylacetanilide. |
| 12 | 2'-tert-butyl-2-chloro-N-chloromethyl-6'-chloro acetanilide. |
| 13 | 2'-tert-butyl-2-chloro-N-chloromethyl-6'-methoxy-acetanilide. |
| 14 | 2'tert-butyl-2-chloro-N- 1-chloroethyl)-6'-methyl-acetanilide. |
| 15 | 2'-tert-butyl-2-chloro-N-(1-chlorododecyl)-6'-methyl-acetanilide. |
| 16 | 2-chloro-2'-tert-butyl-N-(1-chloro-3,7-dimethyl-2,6-octadienyl)-6'-methylacetanilide. |
| 17 | 2'-tert-amyl-2-chloro-N-chloromethyl-6'-methyl-acetanilide. |
| 18 | 2'tert-butyl-2-chloro-N-chloromethyl-6'-iodoacetanilide. |
| 19 | 2'-tert-butyl-2-chloro-N-chloromethyl-6'-bromo-acetanilide. |
| 20 | 2'-tert-butyl-2-chloro-N-chloromethyl-6'-fluoroacet-anilide. |
| 21 | 2',6'-diethyl-N-chloromethyl-2-chloroacetanilide. |
| 22 | 2',6'-dimethyl-N-chloromethyl-2-chloroacetanilide. |
| 23 | 2'-ethyl-6'-methyl-N-chloromethyl-2-chloroacetanilide. |
| 24 | 2'-t-butyl-6'-methoxy-N-bromomethyl-2-bromoacet-anilide. |
| 25 | 2'-t-butyl-4',6'-dimethyl-N-bromomethyl-2-bromo-acetanilide. |
| 26 | 2',4'-dimethyl-N-chloromethyl-2-chloroacetanilide. |
| 27 | 2',4'-dimethyl-N-chloromethyl-2-bromoacetanilide. |
| 28 | 2',4'-dimethyl-N-chloromethyl-2-iodo-acetanilide. |
| 29 | 2',t-butyl-5',6'-dimethyl-N-chloromethyl-2-bromo-acetanilide. |
| 30 | 2'-t-butyl-5',6'-dimethyl-N-chloromethyl-2-chloro-acetanilide. |
| 31 | 2',6'-di-n-amyl-N-chloromethyl-2-chloroacetanilide. |
| 32 | 2',6'-dimethyl-3',4',5'-trichloro-N-chloromethyl-2-chloro-acetanilide. |
| 33 | 2'-methyl-6'-octyl-N-bromomethyl-2-bromoacetanilide. |
| 34 | 2',6'-dimethyl-N-(alpha-chloro-2,4-dimethylbenzyl)-2-chloroacetanilide. |
| 35 | 2',6'-diethyl-N-(alpha-chloro-2,3,4,5,6-pentachlorobenzyl)-2-chloroacetanilide. |

The following examples illustrate the preparation of the starting reactants:

EXAMPLE 36

This example describes the preparation of 2-tert-butyl-6-methylphenylazomethine. To a three-liter flask having a reflux condenser and water trap was added 1,000 g. (6.12 moles) of 2-tert-butyl-6-methylaniline, 240 g. (8 moles-formaldehyde equivalent) of trioxymethylene, 10 g. of 25% trimethylamine in methanol and 500 ml. of toluene. The reaction mixture was refluxed beginning at 95° C. and ending up with a pot temperature of 140° C., at which point no additional water of the reaction was being collected in the water trap. The reaction mass was allowed to cool to room temperature. Weight of the water layer in the water trap was 165 g. containing an appreciable amount of formaldehyde. 90 g. more of trioxymethylene (3 moles equivalent of formaldehyde) were added to the flask and refluxing was continued at 110° C. for an additional one-half hour but no more water was collected in the water trap. The reaction mixture remaining in the flask was then filtered and vacuum distilled through a packed column. The distillate fractions collected were as follows:

| | B.P., °C, | Vacuum, mm. | Weight, grams | $n_D^{25}$ |
| --- | --- | --- | --- | --- |
| Cut No.: | | | | |
| 1 | 114–113 | 16–14 | 311 | 1.5283 |
| 2 | 112–112.5 | 13 | 350 | 1.5284 |
| 3 | 112.5 | 13 | 331 | 1.5284 |
| 4 | 112.5–116 | 13–17 | 55 | 1.5284 |
| Mobil residue | | | 16 | |

During the distillation the pot temperature went from 124 to 150° C. on the last cut. About 1,047 grams of the product were obtained. All of the distillate cuts were clear but had an odor of formaldehyde. An elemental analysis of the product yielded the following results:

Calc'd for $C_{12}H_{17}N$ (percent): C, 82.2; H, 9.8; N, 8.0. Found (percent): C, 81.8; H, 9.9; N, 7.7.

A portion of the product left standing at room temperature for 28 days showed no appreciable change in refractive index, indicating a very stable product.

If in the procedure of Example 1, 6.12 moles of 2-tert-amyl-6-methylaniline are used rather than the 2-tert-butyl-6-methylaniline the resulting product is 2-tert-amyl-6-methylphenyl-azomethine.

EXAMPLE 37

This example describes the preparation of 2-tert-butyl-6-ethylphenylazomethine. To a two-liter flask having a reflux condenser and water trap was added 886 g. (5 moles) of 2-tert-butyl-6-ethylaniline, 200 g. (6.66 moles) of paraformaldehyde, 1 ml. of ammonium hydroxide and 450 ml. of cyclohexane. The reaction mixture was heated to reflux at 80° C. and the pot temperature steadily rose to 90° C. To keep the temperature of the reaction mixture down, an additional 100 g. of cyclohexane was added to the flask. When the reaction was completed, a total of 104 g. of water had been collected in the trap and this water smelled strongly of formaldehyde. The reaction mixture was filtered to remove the solid trioxymethylene and the filtrate was distilled under vacuum through a packed column, taking the following cuts: (1) B.P. 1 mm. 84–85° C., weight 209 g., $n_D^{25}$ 1,5251. This first fraction, though clear, smelled of formaldehyde. (2) B.P. 0.5 mm. 79° C., weight 696 g., $n_D^{25}$ 1.5252, with a faint formaldehyde odor. The last drop over had a refractive index of $n_D^{25}$ 1.5231. The residue in the flask, 25 g., had a refractive index of $n_D^{25}$ 1.5327 and is probably the aniline starting material. An elemental analysis of the 696 g. cut, i.e., cut No. (2) yielded the following results:

Calc'd for $C_{13}N_{19}N$ (percent): C, 82.5; H, 10.1. Found (percent): C, 82.2; H, 10.5.

A sample of this product, stored under nitrogen to prevent oxidation, still had a refractive index of $n_D^{25}$ 1.5252 after standing for 11 months, demonstrating the extreme polymerization resistance of these strongly hindered N-methyleneanilines.

EXAMPLE 38

This example is directed to the preparation of 2-tert-butyl-4,6-dimethylphenylazomethine. To a flask having a reflux condenser and water trap was added 265.5 g. (1.5 mole) of 2-tert-butyl-4,6-dimethylaniline, 200 g. of benzene, 5 g. of 25% trimethylamine in methanol, and 60 g. (2 mole-formaldehyde equivalents) of trioxymethylene. The reactants were heated to temperatures in the range of 83–101° C. with stirring until 44 g. of water had collected in the trap. The residue in the flask was then distilled in a packed column and the following fractions were collected:

| Cut No.: | B.P., ° C. | Vacuum, mm. | Weight, grams | $n_D^{25}$ |
|---|---|---|---|---|
| 1 | 120 | 11 | 26 | 1.5266 |
| 2 | 112 | 6 | 60 | 1.5265 |
| 3 | 112–113 | 6 | 97 | 1.5265 |
| 4 | 112–113 | 6 | 79 | 1.5266 |

There was no residue remaining in the distillation pot at the end of cut 4. An elemental analysis of cut No. 3 yielded the following results:

Calc'd for $C_{13}H_{19}N$ (percent): C, 82.5; H, 10.1. Found (percent): C, 82.2; H, 10.3.

EXAMPLE 39

This example describes the preparation of 2-methoxy-6-tert-butylphenylazomethine. To a three-liter flask having a reflux condenser and water trap is added 1074 g. (6 moles) of 2-methoxy-6-tert-butylaniline, 240 g. (8 moles-formaldehyde equivalent) of trioxymethylene, 10 g. of 25% trimethylamine in methanol, and 500 ml. of toluene. The flask is heated to reflux and most of the water of reaction is removed below 100° C.; however, heating is continued until the pot temperature reaches 140° C. The reaction mixture is then allowed to cool to room temperature. The water layer collected in the trap contains an appreciable amount of formaldehyde. The reaction mixture is filtered to remove any solid trioxymethylene and the filtrate is vacuum distilled through a packed column. The desired product 2-methoxy-6-tert-butylphenylazomethine is recovered in high yield as a distillate fraction.

EXAMPLE 40

This example describes the preparation of 2,6-dimethylphenylazomethine. A reaction vessel equipped with a reflux condenser and water trap was charged with 501 gm. (4.13 moles) of 2,6-dimethylaniline, 165 gm. (5.5 moles-formaldehyde equivalent) of trioxymethylene and 400 gm. of heptane. The reaction mixture was refluxed beginning at 80° C. and ending up with a pot temperature of 115° C., at which point no additional water of the reaction was being collected in the water tray. The reaction mixture remaining in the flask was then filtered and vacuum distilled through a packed column. The distillate fraction boiling in the range of 54° C. to 57° C. at a pressure of 1 mm. of mercury was filtered to remove trioxymethylene to give 328 gm. of 2,6-dimethylphenyloxamethine, a colorless oil, $n_D^{25}$ 1.5742. The product was stable upon standing overnight in benzene solution. After standing for 6 days the product was a solid. The solid was heated at 125° C. for 16 hours causing liquefaction.

EXAMPLE 41

This example describes the preparation of 2-tert-butylphenylazomethine. A reaction vessel equipped with a reflux condenser and water trap was charged with 298 gm. (2 moles) of 2-tert-butylaniline, 92 gm. of paraformaldehyde, 5 ml. of 25% trimethylamine in methyl alcohol and 400 ml. of benzene. The reaction mixture was refluxed beginning at 80° C. and ending up with a pot temperature of 91° C., over a four hour period. The reaction mixture remaining in the flask was vacuum distilled through a packed column. The distillate fraction boiling in the range of 116–117° C. at a pressure of 30 mm. of mercury amounted to 241 gm. of 2-t-butylphenylazomethine, a colorless liquid, $n_D^{25}$ 1.5331.

EXAMPLE 43

This example describes the preparation of 2-isopropyl-6-methylphenylazomethine. A reaction vessel equipped with a reflux condenser and water trap was charged with 208 gm. of 2-isopropyl-6-methylaniline, 60 gm. (2 moles-formaldehyde equivalent) of paraformaldehyde, 5 m. of 25% triethylamine in methanol and 200 gm. of benzene. The reaction mixture was refluxed beginning at 80° C. and ending up with a pot temperature of 95° C. over about one hour. The reaction mass was allowed to cool to room temperature and filtered. The filtrate was vacuum distilled through a packed column. The distillate fraction boiling in the range range of 103–108° C. at a pressure of 10 mm. of mercury amounted to 195 gm. of 2-isopropyl-6-methylphenylazomethine, $n_D^{25}$ 1.5283.

EXAMPLE 44

This example describes the preparation of 2-ethyl-6-methylphenylazomethine. A reaction vessel equipped with a reflux condenser and water trap was charged with 193 gm. of 6-ethyl-o-toluidine, 60 gm. (2 moles-formaldehyde equivalent) of para-formaldehyde, 5 ml. of 25% triethylamine in methanol and 300 ml. of benzene. The reaction mixture was refluxed beginning at 77° C. and ending up with a pot temperature of 90° C., over a period of about 16 hours. The reaction mass was allowed to cool to room temperature. Weight of the water layer in the water trap was 35 gm. containing an appreciable amount of formaldehyde. The reaction mixture remaining in the flask was then filtered and vacuum distilled through a packed column. The distillate fraction boiling in the range of 78–80° C. at a pressure of 5 mm. of mercury was a colorless oil amounting to 197 gm. of 2-ethyl - 6 - methyl-phenylazomethine.

EXAMPLE 45

This example describes the preparation of 2-tert-butyl-6-methylcyclohexylazomethine. A reaction vessel equipped with a reflux condenser and water trap was charged with 253.5 gm. of 2-tert-butyl-6-cyclohexylamine, 65 gm. of paraformaldehyde and 300 gm. of benzene. The reaction mixture was refluxed for 3 hours and then cooled to room temperature. The reaction mixture remaining in the flask was filtered and vacuum distilled through a packed column. The distillate fraction boiling in the range of 103–104° C. at a pressure of 18 mm. of mercury amounted to 201.5 gm. of 2-t-butyl-6-methylcyclohexylazomethine, $n_D^{25}$ 1.4668.

Calc'd for $C_{12}H_{23}N$ (percent): C, 79.49; H, 12.79; N, 7.73. Found (percent): C, 79.62; H, 12.83; N, 7.58.

EXAMPLE 46

This example describes the preparation of 2,6-diethylphenylazomethine. A reaction vessel equipped with a reflux condenser and water trap was charged with 2200 gm. of 2,6-diethylaniline, 600 gm. (20 moles-formaldehyde equivalent) of para-formaldehyde, 15 ml. of 25% triethylamine and 500 gm. of benzene. The reaction mixture was refluxed until paraformaldehyde began to condense in the condenser at which time an air condenser was employed and refluxing resumed for an additional 4½ hours to a final pot temperature of 144° C. The reaction mixture was allowed to cool to room temperature and subjected to vacuum distillation. The fraction boiling in the range of 100–120° C. at a pressure of 10 mm. of mercury was recovered and fractionally distilled in a packed column to obtain the product fraction, 748 gm., having a boiling point of 104° C. at a pressure of 11–12 mm. of mercury, $n_D^{25}$ 1.5278.

EXAMPLE 47

This example describes the preparation of 2-methyl-4,6-di-t-butylphenylazomethine. A reaction vessel equipped with a reflux condenser and water trap was charged with 321 gm. of 4,6-di-t-butyl-o-toluidine, 60 gm. (2 moles-formaldehyde equivalent) of paraformaldehyde, 5 ml. of 25% triethylamine in methanol and 250 gm. of hexane.

The reaction mixture was refluxed beginning at 70° C. and ending up with a pot temperature of 80° C. over a period of about 5 hours. The reaction mass was allowed to cool to room temperature. The reaction mixture remaining in the flask was then filtered and vacuum distilled through a packed column. The distillate fraction boiling in the range of 75–80° C. at a pressure of 0.3 mm. of mercury amounted to 336 gm. of 2-methyl-4,6-di-t-butylphenylazomethine, $n_D^{25}$ 1.5166.

EXAMPLE 48

The pre-emergence herbicidal activity of representative alpha-haloacetanilides of this invention was determined in greenhouse tests in which a specific number of seeds of a number of different plants, each representing a principal botanical type, were planted in greenhouse flats. A good grade of top soil was placed in aluminum pans and compacted to a depth of ⅜ to ½ inch from the top of the pan. On the top of the soil were placed a predetermined number of seeds of each of the following plant species. Morning glory, wild oat, brome grass, rye grass, radish, sugar beet, giant foxtail, crabgrass, pigweed, soybean, wild buckwheat, tomato, sorghum. In the surface applications the seeds were covered by over-filling the pan with soil and striking it level. The measured amount of chemical in a suitable solvent or as a wettable powder was applied to this surface. In the soil incorporation treatments the soil required to level fill the pans after seeding was weighed into a pan, a known amount of the chemical applied in a solvent or as a wettable powder, the soil thoroughly mixed and used as a cover layer for seeded pans. After treatment the pans were moved into a greenhouse bench where they are watered from below as needed to give adequate moisture for germination and growth.

Approximately 14 days after seeding and treating the plants were observed and the results recorded. The herbicidal activity index is based on the average percent germination of each seed lot. The activity index is converted to a relative numerical scale for the sake of brevity and simplicity in the examples. The pre-emergent herbicidal activity index used in this example is as follows:

| Average percent germination | Numerical scale | Herbicidal activity |
|---|---|---|
| 76–100 | 0 | No activity. |
| 51–75 | 1 | Slight. |
| 26–50 | 2 | Moderate. |
| 0–25 | 3 | Severe. |

The pre-emergence herbicidal activity of some of the alpha-haloacetanilides of this invention are recorded in Table I for various application rates of the alpha-haloacetanilide in both surface and soil-incorporated applications. In Table I, the various seeds are represented by letters as follows:

A—General grass
B—General broadleaf
C—Morning Glory
D—Wild oats
E—Brome grass
F—Rye grass
G—Radish
H—Sugar beet
I—Cotton
J—Corn
K—Foxtail
L—Barnyard
M—Crab grass
N—Pigweed
O—Soybean
P—Wild buckwheat
Q—Tomato
R—Sorghum
S—Rice Individual herbicidal ratings for each plant type are reported in Table I. In addition, the total herbicidal rating for all grass plants and the total herbicidal rating for all broadleaf plants are also reported in Table I.

The data in Table I illustrate the outstanding general and selective herbicidal activity of the alpha-haloacetanilides of this invention.

TABLE I.—PRE-EMERGENCE HERBICIDAL ACTIVITY

| Example No. | Compound | Rate, lb./acre | A | B | C | D | E | F | G | H | I | J | K | L | M | N | O | P | Q | R | S | Grass | Broad-leaf | Comments |
|---|---|---|---|---|---|---|---|---|---|---|---|---|---|---|---|---|---|---|---|---|---|---|---|---|
| 1 | 2-bromo-N-bromomethyl-2'-tert-butyl-6'-methylacetanilide. | 5 | 3 | 3 | 3 | 3 | 3 | 3 | 3 | 3 | 3 | 3 | 3 | 3 | 3 | 3 | 3 | 2 | 3 | 3 | ---- | 24 | 23 | (²) |
|  |  | 1 | 3 | 2 | 3 | 3 | 3 | 3 | 2 | 2 | 1 | 2 | 3 | 3 | 3 | 3 | 1 | 1 | 2 | 3 | ---- | 23 | 15 | (²) |
|  |  | ½ | 3 | 1 | 1 | 3 | 3 | 3 | 1 | 2 | 0 | 0 | 3 | 3 | 3 | 3 | 0 | 0 | 2 | 3 | ---- | 21 | 9 | (²) |
|  |  | ¼ | 3 | 0 | 0 | 3 | 3 | 3 | 0 | 0 | 3 | 0 | 3 | 3 | 3 | 3 | 1 | 0 | 2 | 3 | ---- | 24 | 6 | (²) |
|  |  | 0.1 | 3 | 1 | 0 | 3 | 3 | 3 | 2 | 0 | 0 | 1 | 3 | 3 | 3 | 3 | 1 | 1 | 0 | 3 | ---- | 22 | 7 | (²) |
|  |  | 0.05 | 3 | 0 | 0 | 3 | 3 | 3 | 3 | 0 | 0 | 0 | 3 | 3 | 3 | 1 | 0 | 0 | 3 | 3 | 3 | 24 | 1 | (²) |
|  |  | 0.02 | 2 | 0 | 1 | 3 | 1 | 1 | 0 | 0 | 0 | 0 | 2 | 2 | 2 | 0 | 0 | 0 | 0 | 2 | 1 | 14 | 1 | (²) |
| 2 | 2'-tert-butyl-2-chloro-N-chloromethyl-6'-methylacetanilide. | 5 | 3 | 3 | 3 | 3 | 3 | 3 | 3 | 3 | 3 | 3 | 3 | 3 | 3 | 3 | 3 | 3 | 3 | 3 | ---- | 24 | 24 | (²) |
|  |  | 1 | 3 | 3 | 2 | 3 | 3 | 3 | 3 | 3 | 2 | 3 | 3 | 3 | 3 | 2 | 2 | 3 | 3 | ---- | 24 | 20 | (²) |
|  |  | ½ | 3 | 0 | 0 | 1 | 3 | 3 | 0 | 0 | 0 | 3 | 2 | 3 | 3 | 0 | 0 | 0 | 3 | ---- | 18 | 3 | (²) |
|  |  | ¼ | 1 | 0 | 1 | 0 | 2 | 2 | 0 | 0 | 0 | 0 | 2 | 0 | 3 | 2 | 0 | 0 | 0 | 1 | ---- | 10 | 3 | (²) |
| 3 | 2'-tert-butyl-2-chloro-N-chloromethyl-6'-ethylacetanilide. | 5 | 3 | 3 | 3 | 3 | 3 | 3 | 3 | 3 | 1 | 3 | 3 | 3 | 3 | 3 | 2 | 3 | 3 | ---- | 24 | 21 | (²) |
|  |  | 1 | 3 | 3 | 2 | 3 | 3 | 3 | 1 | 2 | 1 | 2 | 3 | 3 | 3 | 3 | 3 | 1 | 1 | 3 | ---- | 23 | 14 | (²) |
|  |  | ½ | 3 | 3 | 1 | 3 | 3 | 3 | 1 | 0 | 0 | 3 | 3 | 3 | 3 | 1 | 0 | 1 | 3 | ---- | 21 | 8 | (²) |
|  |  | ½ | 3 | 1 | 3 | 3 | 3 | 3 | 1 | 1 | 0 | 1 | 3 | 3 | 3 | 3 | 0 | 0 | 2 | 3 | 2 | 24 | 10 | (²) |
|  |  | ¼ | 2 | 1 | 0 | 1 | 1 | 1 | 3 | 2 | 0 | 0 | 3 | 3 | 3 | 0 | 0 | 0 | 3 | ---- | 14 | 8 | (²) |
|  |  | ⅛ | 1 | 0 | 0 | 1 | 0 | 2 | 3 | 0 | 0 | 0 | 3 | 1 | 3 | 1 | 0 | 0 | 0 | 0 | ---- | 10 | 4 | (²) |
| 4 | 2-bromo-N-bromomethyl-2'-tert-butyl-6'-ethylacetanilide. | 5 | 3 | 3 | 2 | 3 | 2 | 3 | 3 | ---- | 3 | ---- | 3 | 3 | 2 | 1 | 3 | 3 | ---- | 17 | 17 | (¹) |
|  |  | 1 | 3 | 2 | 3 | 3 | 3 | 3 | 2 | 3 | 0 | 1 | 3 | 3 | 3 | 3 | 0 | 3 | 3 | 3 | 25 | 15 | (²) |
|  |  | ¼ | 3 | 1 | 0 | 3 | 3 | 3 | 0 | 2 | 0 | 3 | 3 | 3 | 3 | 1 | 0 | 2 | 3 | 1 | 22 | 8 | (²) |
|  |  | 0.05 | 3 | 0 | 0 | 2 | 2 | 2 | 0 | 2 | 0 | 0 | 3 | 3 | 3 | 0 | 0 | 0 | 3 | 1 | 19 | 5 | (²) |
| 5 | 2-bromo-2'-tert-butyl-N-chloromethyl-6'-methylacetanilide. | 5 | 3 | 3 | 3 | 3 | 3 | 3 | 3 | ---- | 3 | ---- | 3 | 3 | 3 | 3 | 3 | 3 | ---- | 18 | 21 | (¹) |
|  |  | 1 | 3 | 3 | 3 | 3 | 3 | 3 | 3 | 3 | 1 | 2 | 3 | 3 | 3 | 3 | 3 | 1 | 3 | 3 | 3 | 26 | 20 | (²) |
|  |  | ¼ | 3 | 1 | 2 | 3 | 3 | 3 | 0 | 2 | 0 | 1 | 3 | 3 | 3 | 2 | 0 | 1 | 3 | 3 | 25 | 10 | (²) |
|  |  | 0.05 | 2 | 1 | 0 | 0 | 0 | 1 | 1 | 2 | 0 | 0 | 3 | 3 | 3 | 2 | 1 | 0 | 1 | 3 | 1 | 14 | 7 | (²) |
| 6 | 2'-tert-butyl-2-chloro-N-(1-chloro-2-butynyl)-6'-methylacetanilide. | 5 | 3 | 3 | 3 | 2 | 3 | 3 | 3 | ---- | 3 | ---- | 3 | 3 | 3 | 3 | 3 | 3 | ---- | 17 | 21 | (¹) |
|  |  | 1 | 3 | 3 | 3 | 3 | 3 | 3 | 3 | 3 | 1 | 3 | 3 | 3 | 3 | 3 | 3 | 0 | 3 | 3 | 3 | 27 | 20 | (²) |
|  |  | ¼ | 3 | 2 | 2 | 3 | 3 | 3 | 2 | 1 | 0 | 1 | 3 | 3 | 3 | 3 | 0 | 0 | 3 | 2 | 24 | 11 | (²) |
|  |  | 0.05 | 1 | 0 | 0 | 1 | 1 | 0 | 0 | 0 | 0 | 0 | 1 | 2 | 2 | 0 | 1 | 0 | 0 | 1 | 0 | 8 | 1 | (²) |

¹ Surface application.   ² Incorporated in soil.

EXAMPLE 43

This example illustrates the surprising pre-emergent herbicidal superiority of compounds of the invention as compared to closely related compounds which do not have the same structure as the compounds of the invention. It is seen from the data in Table II below that the compounds of this invention are a number of times more active as pre-emergent herbicides than the closely related compounds. In Table II the identification of seeds and the herbicidal activity index have the same definition as above.

TABLE III.—POST-EMERGENT HERBICIDAL ACTIVITY OF α-HALOACETANILIDES OF THE INVENTION

| Example No. | Compound | General grass | General broadleaf |
|---|---|---|---|
| 1 | 2-bromo-N-bromomethyl-2-tert-butyl-6'-methylacetanilide. | 2 | 1 |
| 2 | 2'-tert-butyl-2-chloro-N-chloromethyl-6'-methylacetanilide. | 2 | 2 |
| 3 | 2'-tert-butyl-2-chloro-N-chloro-methyl-6'-ethylacetanilide. | 1 | 1 |
| 4 | 2-bromo-N-bromomethyl-2'-tert-butyl-6'-ethylacetanilide. | 2 | 2 |
| 5 | 2-bromo-2'-tert-butyl-N-chloro-methyl-6'-methylacetanilide. | 3 | 3 |
| 6 | 2'-tert-butyl-2-chloro-N-(1-chloro-2-butenyl)-6'-methylacetanilide. | 2 | 3 |
| 7 | 2-bromo-2'-tert-butyl-N-(alpha-bromo-2-hydroxybenzyl)-6-ethyl-acetanilide. | 2 | 3 |

TABLE II.—COMPARISON OF PRE-EMERGENT HERBICIDAL ACTIVITY OF VARIOUS ALPHA-HALOACETANILIDES

| Example No. | Compound | Rate, lb./acre | A | B | C | D | E | F | G | H | K | M | N | O | P | Q | R | Grass | Broad-leaf | Comment |
|---|---|---|---|---|---|---|---|---|---|---|---|---|---|---|---|---|---|---|---|---|
| 1 | 2-bromo-N-bromomethyl-2'-tert-butyl-6'-methylacetanilide. | 1 | 3 | 2 | 3 | 3 | 3 | 3 | 2 | 2 | 3 | 3 | 3 | 1 | 1 | 2 | 3 | 18 | 14 | (²) |
| | | ½ | 3 | 1 | 1 | 3 | 3 | 3 | 1 | 2 | 3 | 3 | 3 | 0 | 0 | 2 | 3 | 18 | 9 | (²) |
| | | ¼ | 3 | 0 | 0 | 3 | 3 | 3 | 0 | 0 | 3 | 3 | 3 | 1 | 0 | 2 | 3 | 18 | 6 | (²) |
| | | 0.1 | 3 | 1 | 0 | 3 | 3 | 3 | 2 | 0 | 3 | 3 | 3 | 1 | 1 | 0 | 3 | 18 | 7 | (²) |
| | | 0.05 | 3 | 0 | 0 | 3 | 3 | 3 | 0 | 0 | 3 | 3 | 1 | 0 | 0 | 0 | 3 | 18 | 1 | (²) |
| | | 0.02 | 2 | 0 | 1 | 3 | 1 | 1 | 0 | 0 | 2 | 2 | 0 | 0 | 0 | 0 | 2 | 11 | 1 | (²) |
| | 2-bromo-N-(2-bromoethyl)-2'-tert-butyl-6'-methylacetanilide. | 1 | 1 | 0 | 0 | 0 | 0 | 0 | 0 | 0 | 2 | 2 | 0 | 0 | 0 | 0 | 3 | 7 | 0 | (²) |
| | | ½ | 1 | 0 | 0 | 0 | 0 | 0 | 0 | 0 | 0 | 3 | 0 | 0 | 0 | 0 | 2 | 5 | 0 | (²) |
| 2 | 2'-tert-butyl-2-chloro-N-chloromethyl-6'-methylacetanilide. | 1 | 3 | 3 | 2 | 3 | 3 | 3 | 3 | 3 | 3 | 3 | 3 | 2 | 2 | 3 | 3 | 18 | 18 | (²) |
| | | ½ | 3 | 0 | 0 | 1 | 3 | 3 | 0 | 0 | 3 | 3 | 3 | 0 | 0 | 0 | 3 | 16 | 3 | (²) |
| | | ½ | 3 | 0 | 0 | 1 | 3 | 3 | 0 | 0 | 3 | 3 | 3 | 0 | 0 | 0 | 3 | 16 | 3 | (²) |
| | | ¼ | 1 | 0 | 1 | 0 | 2 | 2 | 0 | 0 | 2 | 3 | 2 | 0 | 0 | 0 | 1 | 10 | 3 | (²) |
| | 2'-tert-butyl-2'-chloro-N-(2-chloroethyl)-6'-methylacetanilide. | 1 | 1 | 0 | 0 | 0 | 0 | 0 | 0 | 0 | 2 | 3 | 1 | 0 | 0 | 0 | 1 | 6 | 1 | (²) |

² See footnote at end of Table I.

EXAMPLE 50

The post-emergent herbicidal activity of representative alpha-haloacetanilides of this invention was determined in greenhouse tests. The alpha-haloacetanilide to be tested was applied in spray form to 21-day old specimens of the same grasses and broadleaf plants as used in the pre-emergent tests described in Example 48. The same number of seeds of the same plants used in Example 48 were planted in 9½" x 5¾" x 2¾" aluminum pans. After the plants were 21 days old, each aluminum pan was sprayed with 6 ml. of a 0.5% concentration solution of the candidate chemical, corresponding to a rate of approximately 10 lbs. per acre. This herbicidal solution was prepared from an aliquot of 2% solution of the candidate compound in acetone, 0.2 ml. of a 3:1 cyclohexanone-emulsifying agent mix, and sufficient water to make a standard volume. The emulsifying agent was a mixture comprising 33 wt. percent butylamine dodecylbenzene sulfonated and 65 wt. percent of a tall oil-ethylene oxide condensate having about 6 moles of ethylene oxide per mole of tall oil. The injuries to the plants were observed after 14 days and are reported in Table III. The post-emergent herbicidal activity index used in this example is based on the average percent injury of each plant species and is defined as follows:

| Average percent injury | Numerical scale | Herbicidal activity |
|---|---|---|
| 0-25 | 0 | None. |
| 26-50 | 1 | Slight. |
| 51-75 | 2 | Moderate. |
| 76-99 | 3 | Severe. |
| 100 | 4 | Plants dead. |

As demonstrated in the examples above, quite different effects can be obtained by modifying the method of use of the herbicidal compositions of this invention. Thus, unusual grass specificity can be achieved at lower levels of application whereas at higher levels of application a more general herbicidal effect or soil sterilization takes place. Therefore, an essential part of this invention is the formulation of herbicidal compositions that permits a uniform predetermined application of active ingredient to the soil or plant system to produce the desired effect.

In general, the alpha-haloacetanilides of this invention are insoluble in water and somewhat soluble in many organic solvents. The active ingredient need not be dissolved in the extending agent but can merely be dispersed or suspended therein as a suspension or emulsion. Also, the alpha-haloacetanilides may first be dissolved in a suitable organic solvent and the organic solution of the active ingredient then incorporated in water or an aqueous extending agent to form a heterogenous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F., at atmospheric pressure and having flask points above about 80° F., particularly kerosene), and the like. Where true solutions are desired, mixtures of organic solvents have been found to be useful, for example, 1:1 and 1:2 mixtures of xylene and cyclohexanone.

Solid adjuvants in the form of particulate solids are very useful in the practice of the present invention because of the low solubility properties of the alpha-haloacetanilides of this invention. In using this type of adjuvant, the active ingredient is either adsorbed or dispersed on or in the finely-divided solid material. Preferably the solid materials are not hygroscopic but are materials which render the composition permanently dry and free flowing. Suitable particulate solids include the natural clays, such as china clays, the bentonites and the attapulgites; other minerals in natural state, such as talc, pyrophyllite, quartz, diatomaceous earth, fuller's earth, chalk, rock phosphate, kaolin, kieselguhr, volcanic ash, salt, and sulfur; the chemically modified minerals, such as acid-washed bentonite, precipitated calcium phosphate, precipitated calcium carbonate, calcined magnesia, and colloidal silica; and other solid materials such as powdered cork, powdered wood and powdered pecan or walnut shells. These materials are used in finely-divided form, at least in a size range of 20–40 mesh and preferably in much finer size.

The surface active agent, that is the wetting, emulsifying, or dispersion agent, used in the herbicidal compositions of this invention to serve in providing uniform dispersons of all formulation components in both liquid and particulate solid form can be anionic, cationic, nonionic, or mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils; quaternary salts of high molecular weight acids; rosin soaps, such as salts of abietic acid; sulfuric acid salts of high molecular weight organic compounds; algin soaps; ethylene oxide condensated with fatty acids, alkyl phenols and mercaptans; and other simple and polymeric compositions having both hydrophilic and hydrophobic functions.

The liquid herbicidal compositions of this invention generally comprise 0.01% to 99% by weight of the active ingredient with the remainder being herbicidal adjuvant which can be liquid extending agent or surface active agent (including adhesive agent), but preferably in an admixture thereof. Normally it is preferred that the herbicidal adjuvant be the major component in the composition, i.e. be present in the composition in excess of 50% by weight. Preferably, the surface active agent comprises from 0.1% to 15% by weight of the total composition. The remainder of the composition is the liquid extending agent.

The concentration active ingredient in the particulate solid or dust compositions of this invention can vary over wide ranges depending upon the nature of the solid adjuvant and the intended use of the composition. Since the active ingredients of this invention have very high toxicities and are applied at very low rates in order to obtain selectivity, the concentration of the active ingredient in the dust composition can be very low and may comprise as little as 1% or less by weight of the total dust composition. By contrast, when the dust composition is to be used for soil sterilization, it may be desirable to have a very high concentration of active ingredient and for such use the active ingredient can comprise as much as 5% to 98% by weight of the total composition. The remainder of the composition is the herbicidal adjuvant which is usually only the particulate solid extending agent. Normally it is preferred that the solid herbicidal adjuvant be the major component in the composition, i.e., be present in the composition in excess of 50% by weight. Thus, the surface active agent is not usually required in dust compositions although it can be used if desired. However, if the particulate solid compositions are to be applied as a wettable powder, a surface active agent must be added. Ordinarily the amount of surface active agent will be in the range of 0.1%— to 15% by weight of the herbicidal composition.

The herbicidal compositions of this invention can also contain other additaments, for example fertilizers, pesticides and the like, used as adjuvant or in combination with any of the above-described adjuvants. Herbicides useful in combination with the above-described compounds include for example 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis(3-methoxypropylamino) - 6 - methylthio - S - triazine; 2-chloro-4-ethylamino - 6 - isopropylamino-S-triazine, and 2-ethylamino - 4 - isopropylamino-6-methylmercapto-S-triazine; urea derivatives, such as 3-(3,4-dichlorophenyl)-1,1-dimethyl urea and 3-(p-chlorophenyl)-1,1-dimethyl urea, acetanilides such as N-isopropyl-alpha-chloro-acetanilide and N-ethyl-alpha-chloro-2-methylacetanilide, and acetamides such as N,N-diallyl-alphachloroacetamide, N-(alpha-chloroacetyl)hexamethylene imine, and N,N-diethyl-alpha-bromo-acetamide, and the like. Fertilizers useful in combination with the active ingredients include for example ammonium nitrate, urea and superphosphate. Other useful additaments include materials in which plant organisms take root and grow such as compost, manure, humus, sand and the like.

The herbicidal compositions of this invention are applied to the plant systems in the conventional manner. Thus, the dust and liquid compositions can be applied to the plant systems by the use of power-dusters, boom and hand sprayers and spray-dusters. The compositions can also be applied from airplanes as a dust or a spray because they are effective in a very low dosage. In order to modify or control growth of germinating seeds or emerging seedlings, the dust and liquid compositions are applied to the soil according to conventional methods and are preferably distributed in the soil to a depth of at least ½ inch below the soil surface. It is not absolutely necessary that the herbicidal compositions be admixed with the soil particles and these compositions can be applied merely by spraying or sprinkling the surface of the soil. The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by conventional means such as discing, dragging or mixing operations.

The application of an effective amount of active ingredient to the plant system is essential in the practice of the present invention. The exact dosage to be applied is dependent not only upon the specific alpha-haloacetanilide but also upon the particular plant species to be controlled and the stage of growth thereof as well as the part of the plant to be contacted with the toxicant. In non-selective foliage treatments, the herbicidal compositions of this invention are usually applied at a rate sufficient to obtain from 5 to 50 lbs. of alpha-haloacetanilide per acre but lower or higher rates can be applied in some cases. In non-selective pre-emergence treatments, the herbicidal compositions are usually applied at a somewhat lower rate than in foliage treatments but at a rate which is ordinarily within the same general range, that is at a rate in the range of 1 to 25 lbs. per acre. However, because of the unusually high unit activity possessed by the active ingredients of this invention, soil sterilization is ordinarily accomplished at a rate of application in the range of 1 to 10 lbs. per acre. In selective pre-emergence applications to the soil, a dosage of from 0.05 to 5 lbs. of active ingredient per acre is usually employed but lower or higher rates may be necessary in some instances. It is believed that one skilled in the art can readily determine from the disclosure, including the examples, the optimum rate to be applied in any particular case.

The terms "soil" and "growth media" are employed in the present specification and claims in their broadest sense to be inclusive of all conventional "soils" as defined in Webster's New International Dictionary, Second Edition, Unabridged (1961). Thus the terms refer to any substance or media in which vegetation may take root and grow, and are intended to include not only earth but compost, manure, muck, humus, sand and the like, adapted to support plant growth.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather the claims be construed as encompassing all the features of patentable novelty which reside in the present invention including all features which would be treated as equivalents thereof by those skilled in the art to which the invention pertains.

What is claimed is:

1. Compound of the formula

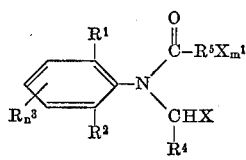

wherein $R^1$ is alkyl having a maximum of ten carbon atoms; $R^2$ is selected from the group consisting of hydrogen, alkyl having a maximum of eight carbon atoms and alkoxy having a maximum of four carbon atoms; $R^3$ is selected from the group consisting of chlorine, bromine, iodine, alkyl having a maximum of eight carbon atoms and alkoxy having a maximum of four carbon atoms; $R^4$ is selected from the group consisting of hydrogen, alkyl, alkenyl, alkynyl each having a maximum of eighteen carbon atoms and the group

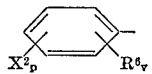

wherein $X^2$ is selected from the group consisting of chlorine, bromine, iodine and fluorine; $R^6$ is selected from the group consisting of hydroxy and alkyl having a maximum of four carbon atoms; $p$ is one of the integers 0 to 5; $v$ is one of the integers 0 to 2; $R^5$ is selected from the group consisting of alkyl having a maximum of 18 carbon atoms, and phenyl; $X$ and $X^1$ are each independently selected from the group consisting of chlorine, bromine and iodine; $m$ is one of the integers 0 to 5; and $n$ is one of the integers 0 to 3.

2. A compound in accordance with claim 1 in which $R^1$ and $R^2$ are each independently alkyl having a maximum of ten carbon atoms; $R^3$ is selected from the group consisting of chlorine, bromine, iodine and alkyl having a maximum of eight carbon atoms; $R^4$ is selected from the group consisting of hydrogen, alkyl, alkenyl each having a maximum of eighteen carbon atoms, and the group

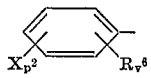

and $X$ and $X^1$ are each independently selected from the group consisting of chloro, bromo and iodo.

3. A compound according to claim 1 in which $R^1$ and $R^2$ are each independently alkyl having a maximum of four carbon atoms; $R^3$ is selected from the group consisting of chlorine, bromine, iodine and alkyl having a maximum of four carbon atoms; $R^4$ is selected from the group consisting of hydrogen, alkyl, alkenyl each having a maximum of six carbon atoms and the group

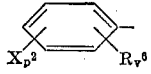

$p$ is one of the integers 0 to 3; $R^5$ is selected from the group consisting of alkyl having a maximum of four carbon atoms; $X$ and $X^1$ are each independently selected from the group consisting of chloro, bromo and iodo; $m$ is one of the integers 0 to 2; and $n$ is one of the integers 0 to 2.

4. A compound in accordance with claim 3 in which $R^5$ is methyl and $m$ is one.

5. A compound in accordance with claim 4 in which $n$ is zero.

6. A compound in accordance to claim 5 in which $R^4$ is hydrogen.

7. A compound in accordance to claim 4 in which $R^1$ is tertiary butyl.

8. A compound in accordance to claim 6 which is 2′,6′-diethyl-N-chloromethyl-2-chloro-acetanilide.

9. A compound in accordance to claim 6 which is 2′,6′-dimethyl-N-chloromethyl-2-chloroacetanilide.

10. A compound in accordance to claim 7 which is 2′-tertiary butyl - 6′ - methyl - N - chloromethyl-2-chloro-acetanilide.

11. Process for the preparation of a compound of the formula

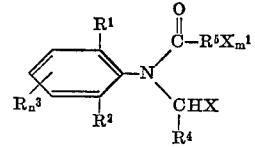

wherein $R^1$ is alkyl having a maximum of ten carbon atoms; $R^2$ is selected from the group consisting of hydrogen, alkyl having a maximum of eight carbon atoms and alkoxy having a maximum of four carbon atoms; $R^3$ is selected from the group consisting of chlorine, bromine, iodine, alkyl having a maximum of eight carbon atoms and alkoxy having a maximum of four carbon atoms; $R^4$ is selected from the group consisting of hydrogen, alkyl, alkenyl, alkynyl each having a maximum of eighteen carbon atoms and the group

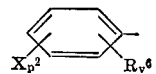

wherein $X^2$ is selected from the group consisting of chlorine, bromine, iodine and fluorine; $R^6$ is selected from the group consisting of hydroxy and alkyl having a maximum of four carbon atoms; $p$ is one of the integers 0 to 5; $v$ is one of the integers 0 to 2; $R^5$ is selected from the group consisting of alkyl having a maximum of 18 carbon atoms, and phenyl, $X$ and $X^1$ are each independently selected from the group consisting of chlorine, bromine, and iodine; $m$ is one of the integers 0 to 5; and $n$ is one of the integers 0 to 3; which comprises reacting a compound of the formula

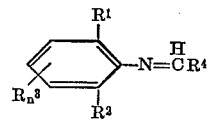

wherein $R^1$, $R^2$, $R^3$, $R^4$ and $n$ are defined above with a compound of the formula

$$XOCR^5X^1_m$$

wherein $R^5$, $X$, $X^1$ and $m$ are as defined above in an inert organic solvent.

12. A process according to claim 11 in which $R^5$ is methyl and $m$ is one.

13. A process according to claim 12 in which $n$ is zero.

14. A process according to claim 13 in which $R^4$ is hydrogen.

15. A process according to claim 14 in which $R^1$ is tertiary butyl.

16. A process according to claim 15 in which the compound is 2'-tertiary butyl-6'-methyl-N-chloromethyl-2-chloroacetanilide.

17. A process according to claim 14 in which the compound is 2',6'-diethyl-N-chloromethyl-2-chloroacetanilide.

18. A process according to claim 14 in which the compound is 2',6'-dimethyl-N-chloromethyl-2-chloroacetanilide.

References Cited

UNITED STATES PATENTS

| | | | |
|---|---|---|---|
| 3,442,945 | 5/1969 | Olin | 260—562 |
| 2,863,752 | 12/1958 | Hamm | 260—562 |

HENRY R. JILES, Primary Examiner

H. J. MOATZ, Assistant Examiner

U.S. Cl. X.R.

260—558 (P), 562 (R), 566 (D), 566 (F); 71—118